2,827,358

Patented Mar. 18, 1958

2,827,358

PREPARATION OF STABLE COMPOSITIONS OF SULFURIC ACID HALF ESTERS OF LEUCO VAT DYESTUFFS

Earl Kaplan, North Plainfield, and Wendell Philip Munro, Martinsville, N. J., assignors to American Cyanamid Company, New York, N. Y., a corporation of Maine No Drawing. Application June 15, 1953
Serial No. 361,860

15 Claims. (Cl. 8—35)

This invention relates to the preparation of improved dyestuff compositions and more particularly is concerned with the preparation of stable compositions of sulfuric acid half esters of leuco vat dyestuffs.

It is known that many alkali metal salts of sulfuric acid half esters of leuco vat dyestuffs tend to be unstable on storage and are readily decomposed by acids. In order to prepare stable preparations in powder form, it has been proposed to blend intimately with the dyestuffs a certain amount of alkali, for example, sodium carbonate. However, the stability of the products prepared by this procedure has not been fully satisfactory on long periods of storage.

It is known that the sulfuric acid half esters of leuco vat dyestuffs, particularly the esters of leuco vat dyestuffs of the anthraquinone series, undergo a slow decomposition even in the presence of alkali such as sodium carbonate. The decomposition appears to be autocatalytic since each mole of decomposed solubilized dyestuff releases acidic products in the form of $SO_2$, $CO_2$, $HCl$ and traces of $SO_3$. Normal quantities of alkali alone, which are added and intended to inhibit such decomposition are, therefore, inadequate. If greater quantities of alkali are used, then the dyeing and printing properties of the solubilized dyestuffs suffer. Since most of the leuco sulfuric acid half esters are applied on the cloth in the form of a solution or a paste, and thence developed thereon with an acid such as nitrous acid, chromic acid, etc. the use of large amounts of alkali tends to retard such development and results in weak and spotty dyeings or printings.

It has also been proposed to use urea as an aid in preventing this decomposition. This proposal has not been wholly satisfactory, however, because the dyestuff preparations so stabilized exhibit the undesirable characteristics of caking upon standing and have an undesirable odor of ammonia.

In accordance with the present invention, it has been found that it is possible to prepare stable free-flowing compositions of sulfuric acid half esters of leuco vat dyestuffs which are markedly superior to those known heretofore and which do not possess any of the disadvantages of the compositions of the prior art.

It is an advantage of the present invention that the improved compositions contain a minimum amount of alkali and thus the dyeings may be developed readily by suitable acids without danger of producing weak or spotty dyeings or printings.

It is a further advantage of the improved compositions that they do not give off any undesirable ammoniacal odor nor do such compositions have any tendency to lump or cake on storage. In addition, the present novel compositions are of greatly increased stability and no evidence of decomposition of the stabilized dyestuffs have been observed after prolonged periods of storage. Moreover, no change in shade or strength of the dyestuff has been found to take place.

The novel compositions of the present invention are preferably prepared by intimately mixing a wet alkali metal salt of a sulfuric acid half ester of a leuco vat dyestuff with a small amount of alkali, an agglutinant, and a nitrogenous compound as more particularly hereinafter described. The mass is inimately mixed and is thereafter evaporated to dryness, preferably under reduced pressure. The dried material is then ground and diluted to type with sodium sulfate, sugar or other suitable diluents.

We have found dicyandiamides to be remarkably effective in peventing the ecomposition of leuco vat dyestuffs. These compounds may be represented by the formula

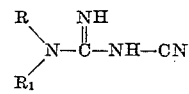

wherein R and $R_1$ are members of the group consisting of hydrogen, alkyl, hydroxyalkyl, aralkyl and aryl radicals.

Suitable compounds useful in the present invention thus include dicyandiamide and substituted dicyandiamides such as methylol dicyandiamide, 1-para-chlorophenyl dicyandiamide, 1-naphthyl dicyandiamide, 1-cyclohexyl dicyandiamide, 1-butyl dicyandiamide, 1-dodecyl dicyandiamide, 1-benzyl dicyandiamide, 1-methyl-1-phenyl dicyandiamide, etc.

Other substituted dicyandiamides which have been found useful in the practice of the present invention include ethylene-bis dicyandiamide and carboalloxy dicyandiamide.

By employing dicyandiamide and substituted dicyandiamides in the preparation of the novel compositions of the present invention, it has been found that a suprisingly free-flowing powder of great stability is obtained. Moreover, it has also been found that much less inorganic alkali can be used than is customarily employed. This is advantageous because the prior procedures required an excess inorganic alkali which affects adversely the printing properties of the compositions.

For optimum beneficial effect, the dicyandiamides are preferably added to the dyestuff preparations to the extent of from 1% to 15% by weight of the parent vat dye.

Suitable agglutinants which may be used in the preparation of the stable compositions of the present invention include dextrine, glucose, cane sugar molasses, carbohydrates, glue and similar substances.

As stated above, the process of the present invention permits the use of smaller quantities of inorganic alkali than are customarily employed. In general, therefore, it is rarely necessary to use more than about 5% by weight.

Sulfuric acid half esters of leuco vat dyes in general may be successfully treated by the present invention. The treatment is particularly advantageous to the sulfuric acid half esters of leuco vat dyes of the anthraquinone series such as the sulfuric ester salts of leuco quinones, as described in U. S. Patent No. 2,403,226 and leuco sulfuric esters of gray vat dyestuffs as described in U. S. Patent Nos. 2,456,589 and 2,540,783. Typical examples are bz-2-bz-2'-dimethoxydibenzanthrone, 4,4'-dimethyl-6,6' - dichlorothioindigo, 1,1'-4,1'''-trianthrimide-2,2'-3,2''-dicarbazole, anthraquinone-1,2:5,6-di(C - phenylthiazole) and 4,4';5,5'-dibenzthioindigo.

The invention will be described in greater detail in conjunction with the following specific examples in which the parts are by weight unless otherwise specified.

*Example 1*

400 lbs. of the alkali metal salt of the leuco sulfuric acid half ester prepared from the dye described in U. S. Patent No. 2,456,589, in the form of a filter presscake containing dye solids equivalent to 100 lbs. of the parent vat dyestuff, is intimately mixed with 20 lbs. of dextrine, 15 lbs. of methylol dicyandiamide and 5 lbs. of caustic soda. This dye is described and claimed in Patent 2,540,783 as a sulfuric acid half ester of the leuco form of a vattable dyestuff produced by chlorinating benzanthrone in sulfuric acid of 85–100% concentration at temperatures between 10° and 50° until a sample precipitated by water shows a chlorine content between 11.5 and 13.5%, discontinuing the chlorination and recovering the so-chlorinated benzanthrone mixture containing 11.5 to 13.5% combined chlorine thus obtained, condensing the said chlorinated benzanthrone mixture with approximately one molecular equivalent of alpha-amino-anthraquinone in nitrobenzene in the presence of an acid-binder and a cupriferous catalyst to produce a mixture of secondary amines and recovering the mixture of secondary amines so produced and subjecting said mixture of secondary amines thus produced to fusion with alcoholic caustic alkali. As soon as the mass is properly mixed, the water is removed at 60° C. under reduced pressure in a vacuum dryer. The gray-black powder is then ground and diluted as desired by mixing in 10–20 lbs. of anhydrous powdered sodium sulfate. A sample of the dyestuff composition thus formulated is placed in a closed bottle in a 65° C. oven and held at this temperature for 100 days. No signs of decomposition of the dyestuff are observed by either a spectrophotometer or by the formation of an insoluble product after this storage period. Severe decomposition is observed after 7 days storage at 65° C. on an identical product formulated with 20 lbs. of alkali as sodium carbonate but omitting the methylol dicyandiamide.

*Example 2*

400 lbs. of the alkali metal salt of the leuco sulfuric acid half ester of anthraquinone-1,2:5,6-di(C-phenylthiazole), in the form of a filter presscake containing dye solids equivalent to 100 lbs. of the parent vat dyestuff and 5 lbs. of alkali as sodium carbonate are intimately mixed with 20 lbs. of dextrine and 5 lbs. of dicyandiamide. No additional alkali is needed. When the mass is uniformly mixed, it is dried under reduced pressure in a vacuum dryer. The bright yellow product is then ground. A sample of the product thus formulated is placed in a closed bottle in a 65° C. oven and held at this temperature for 50 days. No signs of decomposition of the dyestuff or the formation of the insoluble vat are observed after this storage period, whereas severe decomposition is observed after 12 days storage at 65° C. on an identical product stabilized with 30 lbs. of alkali as sodium carbonate but omitting the dicyandiamide.

*Example 3*

400 lbs. of the potassium salt of the leuco sulfuric acid half ester of bz-2-bz-2'-dimethoxydibenzanthrone in the form of a filter presscake containing dye solids equivalent to 100 lbs. of the parent vat dyestuff is intimately mixed wtih 20 lbs. of dextrine, 15 lbs. of dicyandiamide, and 5 lbs. of alkali as caustic soda. When the mass is uniformly mixed, the water is removed at 60° C. under reduced pressure in a vacuum dryer. The reddish brown product is then ground and diluted to the desired strength with sodium sulfate. A sample of the product thus formulated is placed in a closed bottle in a 65° C. oven and held at this temperature for more than 60 days. No signs of decomposition of the deystuff or the formation of the insoluble vat are observed after this storage period, whereas severe decomposition is observed after 14 days storage at 65° C. on an identical product stabilized with 10–15 lbs. of alkali as potassium carbonate but omitting the dicyandiamide. Also, there is no caking of the product of this example as compared to a product stabilized with urea, dextrine and alkali.

*Example 4*

500 lbs. of the sodium salt of the leuco sulfuric acid half ester of 4,4'-dimethyl-6,6'-dichlorothioindigo in the form of a filter presscake containing dye solids equivalent to 100 lbs. of the parent vat dyestuff is intimately mixed with 20 lbs. of dextrine, 15 lbs. of dicyandiamide, and 5 lbs. of alkali as sodium carbonate. When the mass is uniformly mixed, the water is removed at 60° C. under reduced pressure in a vacuum dryer. The white to pale-pink powder is then ground. A sample of the product thus formulated is placed in a closed bottle in a 100° C. oven and maintained at this temperature for more than 100 days. No signs of decomposition are observed after this storage period. Samples stabilized with 10 lbs. of sodium carbonate are stable for only 3 days at 100° C. and for only 14 days at 65° C.

The same increase in stability is also obtained in the case of the corresponding leuco sulfuric acid half ester of 4,4';5,5'-dibenzthioindigo.

*Example 5*

To a vessel equipped with a high speed stirrer, there is charged 300 lbs. of the sodium salt of the leuco sulfuric acid half ester of the product described in U. S. Patent No. 2,540,783, 15 lbs. of dextrine, 7½ lbs. of dicyandiamide, 3½ lbs. of caustic soda and 30 lbs. of water. The mixture is stirred until the slurry is thin and uniform, adding more water if necessary. The mass is discharged to dryer pans and dried at 65° C. as specified in the preceding examples until the moisture content reaches 15%. The mass is then dried at 35° C. until the final moisture content is about 11%. The dried material is discharged, ground and reduced to type with sodium sulfate. Samples of this product when tested for decomposition as specified in the preceding examples are found to be stable at 65° C. for more than 48 days.

*Example 6*

350 lbs. of the alkali metal salt of the leuco sulfuric acid half ester of 1,1'-4.1''-trianthrimide-2,2'-3,2''-dicarbazole in the form of a filter presscake containing dye solids equivalent of 100 lbs. of the parent vat dyestuff is intimately mixed with 20 lbs. of dextrine, 15 lbs. of dicyandiamide, and 5 lbs. of alkali as sodium carbonate. The slurry is stirred until thin and uniform and is discharged to dryer pans and dried under reduced pressure and vacuum dryer until the final moisture content is 2.0%. The dried material is discharged, ground and reduced to type as in the preceding examples. Samples of the product are tested for decomposition as specified in the preceding examples. No evidence of decomposition is observed after more than 33 days storage at 65° C., whereas similar blends with soda ash alone decomposed in a matter of 7 days storage at 65° C.

*Example 7*

400 lbs. of the alkali metal salt of the leuco sulfuric acid half ester of indigo in the form of a filter presscake containing dye solids equivalent to 100 lbs. of the parent vat dyestuff is intimately mixed with 20 lbs. of dextrine, 15 lbs. of dicyandiamide and 5 lbs. of alkali as caustic soda. When the mass is uniformly mixed, the water is removed at 60° C. under reduced pressure in a vacuum dryer. The light tan product is then ground and diluted to the desired strength with sodium sulfate. A sample of the product thus formulated is placed in a closed bottle in a 65° C. oven and held at this temperature for more than 30 days. No signs of decomposition or the formation of the insoluble vat are observed after this storage period, whereas severe decomposition is observed after six days storage at 65° C. on an identical product stabilized with 10–15 lbs. of potassium carbonate but omitting the dicyandiamide.

*Examples 8–12*

25 parts of the alkali metal salt of the leuco sulfuric acid half ester of anthraquinone-1,2:5,6-di(C-phenylthiazole) in the form of a wet presscake containing dye solids equivalent to 5 parts of the parent vat dyestuff is intimately mixed with 1 part of dextrine, 5 parts of water and 0.75 part, to separate batches, of the following dicyandiamides: carboalloxy dicyandiamide, 1-p-chlorophenyl dicyandiamide, 1-methyl-1-phenyl dicyandiamide, 1-dodecyl dicyandiamide and ethylene-bis dicyandiamide. The individual preparations are mixed thoroughly and dried. In all of these preparations, the stability was markedly superior to the control.

We claim:

1. A stable, noncaking dyestuff composition comprising an alkali metal salt of a sulfuric acid half ester of a leuco vat dyestuff, a small amount of inorganic alkali, an agglutinant selected from the group consisting of dextrine, glucose, cane sugar molasses and glue, and from 1 to 15% by weight of the real vat dye equivalent of a compound of the formula

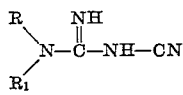

wherein R is selected from the group consisting of hydrogen and methyl radicals and $R_1$ is selected from the group consisting of hydrogen, alkyl and hydroxyalkyl radicals of not more than 12 carbon atoms, and aralkyl and aryl hydrocarbon radicals.

2. A composition according to claim 1 wherein the compound is dicyandiamide.

3. A composition according to claim 2 wherein the vat dyestuff is bz-2-bz-2'-dimethoxydibenzanthrone.

4. A composition according to claim 2 wherein the leuco vat dyestuff is a leuco anthraquinone vat dyestuff.

5. A composition according to claim 4 wherein the anthraquinone vat dyestuff is anthraquinone-1,2:5,6-di(C-phenylthiazole).

6. A composition according to claim 4 wherein the anthraquinone vat dyestuff is 1,1'-4,1''-trianthrimide-2,2'-3,2''-dicarbazole.

7. A composition according to claim 1 wherein the compound is methylol dicyandiamide.

8. The process of preparing dry stable compositions of sulfuric acid half esters of leuco vat dyestuffs which comprises intimately mixing a wet alkali metal salt of said esters with a small amount of inorganic alkali, an agglutinant and from 1 to 15% by weight of the real vat dye equivalent of a compound of the formula

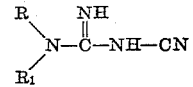

wherein R is selected from the group consisting of hydrogen and methyl radicals and $R_1$ is selected from the group consisting of hydrogen, alkyl and hydroxyalkyl radicals of not more than 12 carbon atoms, and aralkyl and aryl hydrocarbon radicals, so as to form a paste, evaporating the paste to dryness, and grinding the same.

9. The process according to claim 8 wherein the compound is dicyandiamide.

10. The process according to claim 8 wherein the compound is methylol dicyandiamide.

11. A stable, noncaking finely ground dry dyestuff comprising the potassium salt of the leuco sulfuric acid half ester of bz-2-bz-2' dimethoxydibenzanthrone equivalent to 100 parts of the parent vat dyestuff, about 5 parts of caustic soda, about 20 parts of dextrine, and about 15 parts of dicyandiamide.

12. A stable, noncaking finely ground dry dyestuff consisting essentially of the potassium salt of the leuco sulfuric acid half ester of bz-2-bz-2' dimethoxydibenzanthrone equivalent to 100 parts of the parent vat dyestuff, about 5 parts of caustic soda, about 20 parts of dextrine, about 15 parts of dicyandiamide and sufficient sodium sulfate to dilute to a desired strength.

13. A stable, noncaking finely ground dry dyestuff comprising an alkali metal salt of a sulfuric acid half ester of a leuco vat dyestuff equivalent to 100 parts of the parent dyestuff, from the amount present in a dye filter presscake up to 5 parts of inorganic alkali, an agglutinant, selected from the group consisting of dextrine, glucose, cane sugar molasses, and glue, and from 1 to 15 parts of a compound of the formula

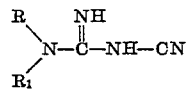

wherein R is selected from the group consisting of hydrogen and methyl radicals and $R_1$ is selected from the group consisting of hydrogen, alkyl and hydroxyalkyl radicals of not more than 12 carbon atoms, and aralkyl and aryl hydrocarbon radicals.

14. A composition according to claim 13 wherein the leuco vat dyestuff is a sulfuric acid half ester of the leuco form of a vattable dyestuff produced by chlorinating benzanthrone in sulfuric acid of 85–100% concentration at temperatures between 10° and 50° until a sample precipitated by water shows a chlorine content between 11.5 and 13.5%, discontinuing the chlorination and recovering the so-chlorinated benzanthrone mixture containing 11.5 to 13.5% combined chlorine thus obtained, condensing the said chlorinated benzanthrone mixture with approximately one molecular equivalent of alpha-amino-anthraquinone in nitrobenzene in the presence of an acid-binder and a cupriferous catalyst to produce a mixture of secondary amines and recovering the mixture of secondary amines so produced and subjecting said mixture of secondary amines thus produced to fusion with alcoholic caustic alkali.

15. A composition according to claim 14 wherein the compound is methylol dicyandiamide.

References Cited in the file of this patent

UNITED STATES PATENTS

| 2,389,245 | Wiazmitinow | Nov. 20, 1945 |
| 2,432,041 | Ratti | Dec. 2, 1947 |

FOREIGN PATENTS

| 792,611 | France | Jan. 7, 1936 |
| 235,027 | Switzerland | Mar. 1, 1945 |